US012789853B1

(12) United States Patent
Chebiyyam et al.

(10) Patent No.: US 12,789,853 B1
(45) Date of Patent: Nov. 10, 2026

(54) MICROPHONE SUB-SELECTION

(71) Applicant: Zoox, Inc., Foster City, CA (US)

(72) Inventors: Venkata Subrahmanyam Chandra Sekhar Chebiyyam, Mountain View, CA (US); Aurora Linh Cramer, San Mateo, CA (US); Jonathan Tyler Dowdall, Greenbrae, CA (US); Xuan Zhong, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 43 days.

(21) Appl. No.: 18/677,711

(22) Filed: May 29, 2024

(51) Int. Cl.
*B60W 60/00* (2020.01)
*B60W 40/04* (2006.01)

(52) U.S. Cl.
CPC ........ *B60W 60/0017* (2020.02); *B60W 40/04* (2013.01); *B60W 2420/10* (2013.01); *B60W 2420/54* (2013.01); *B60W 2555/60* (2020.02); *B60W 2556/20* (2020.02); *B60W 2556/50* (2020.02)

(58) Field of Classification Search
CPC ............ B60W 60/0017; B60W 40/04; B60W 2420/10; B60W 2420/54; B60W 2555/60; B60W 2556/20; B60W 2556/50
See application file for complete search history.

(56) References Cited

U.S. PATENT DOCUMENTS

2014/0369509 A1* 12/2014 Fukamachi ............ H04R 29/00 381/56
2018/0211528 A1* 7/2018 Seifert ................. G08G 1/0965
2022/0060822 A1* 2/2022 Chng ..................... H04R 1/083
2022/0180895 A1* 6/2022 Penniman ............... G10L 25/78
2024/0196124 A1* 6/2024 Duan .................... B60W 10/18

* cited by examiner

*Primary Examiner* — Toya Pettiegrew
(74) *Attorney, Agent, or Firm* — EIP US LLP

(57) ABSTRACT

At a first time, first data generated by a first subset of microphones of a plurality of microphones associated with an autonomous vehicle in an environment may be obtained. At a second time that is different from the first time, second data generated by a second subset of microphones of the plurality of microphones may be obtained. At least one of the first subset of microphones or the second subset of microphones may comprise less than all the microphones of the plurality of microphones. Based on at least one of the first and second data, an indication of whether an audio event is present in the environment may be determined.

20 Claims, 8 Drawing Sheets

MICROPHONE SUB-SELECTION

BACKGROUND

Some systems, both real and simulated, include multiple microphones to facilitate audio perception and sensing capabilities for that system. Each of the multiple microphones includes means to detect sound and to convert the sound into an audio signal, which can be stored as audio data. The audio data generated by each microphone may be interpreted as a single channel of a multichannel audio signal. The multichannel audio signal may then be processed to detect audio perception events in the vicinity of the system. Such audio perception events may include warning signals and environmental conditions, for example. Thus, the audio data generated by each of the multiple microphones may be used to provide information about an environment around the system.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
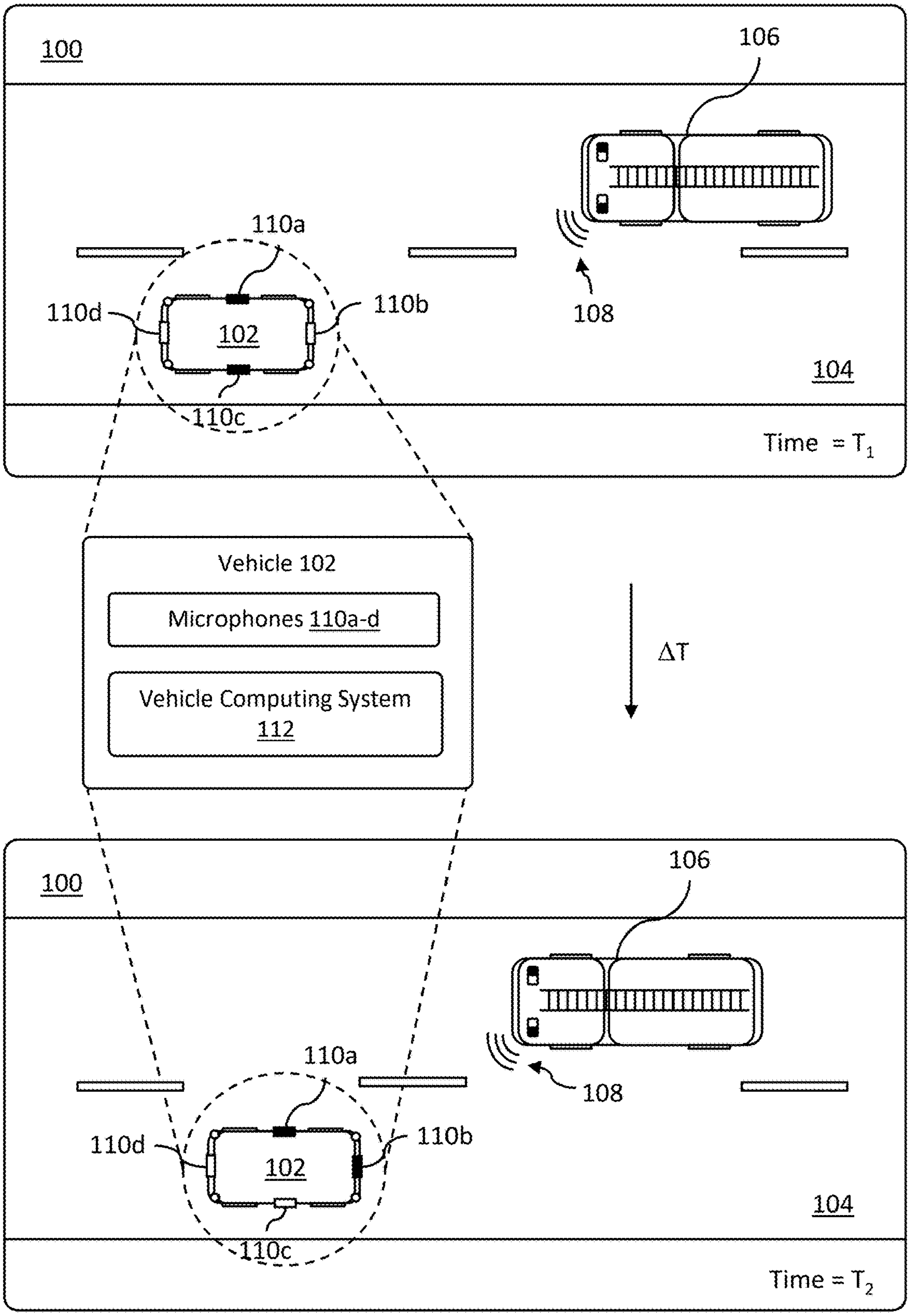
FIG. 1 is an illustration of a vehicle operating in an environment and implementing a microphone channel sub-selection process, in accordance with examples of this disclosure.

This disclosure relates to techniques for improving efficiency of audio perception event detection. As described above, certain systems, such as autonomous vehicles, may be associated with multiple audio sensors, such as microphones, that generate respective audio data. The audio data may be combined to form a multichannel signal and processed to provide an indication that an audio perception event has been detected in the audio data. In other examples, pairs of microphones may be utilized to determine, for example, direction of arrival for events such as ambulance sirens, police sirens, etc. to provide additional context to systems such as autonomous vehicles. This processing may be repeated at a particular rate using the full multichannel signal (e.g., all of the microphone sensor data). The rate at which data is processed may be determined by the available compute resources.

While this approach may be applied to obtain maximum accuracy in audio perception event detection, it can be computationally intensive. The techniques described herein reduce the requires computational resources (e.g., processors and memory) to achieve the same or similar results. For instance, where the system comprises an autonomous vehicle, a siren detected by a first microphone positioned on the front of the vehicle may also be detected by a second microphone positioned on a side of the vehicle, though such detections may differ. The result of processing audio data generated by each of the first and second microphones may be the same or similar; that there is a likelihood of an audible siren in the vicinity of the autonomous vehicle.

Furthermore, certain sub-selections of microphones may have some advantages over other sub-selections, for a given scenario. To see this, consider again the autonomous vehicle example discussed above, wherein the autonomous vehicle is within audible proximity of a siren. At a first time, data generated by each of the microphones may indicate that the first microphone detected the siren first due to the direction from which the siren originates. In such cases, not only can the computational resources be reduced at a later time by processing data generated by fewer than both of the first and second microphones, but by processing only the data from the first microphone at the later time may mean that there is a higher probability that the siren will be detected at the later time. The techniques described herein therefore also include procedures for intelligently selecting microphones to be in each subset, at a given time.

While the techniques described herein are discussed primarily with respect to vehicles associated with a plurality of microphones, it is understood that the techniques may be applicable to other systems that are associated with a plurality of microphones, and which may use the microphones to perform an aspect of audio perception event detection. For instance, while FIG. 1 that will now be described shows an example microphone sub-selection process with regards to an autonomous vehicle, it is understood that such a process may be applied in various other systems, such as those associated with teleconferencing, live music performances and other types of vehicular transport (e.g. non-autonomous vehicles, aviation, nautical).

FIG. 1 is a schematic diagram illustrating a vehicle 102 operating in an example environment 100. In the illustrated example, the vehicle 102 is traversing a road 104 in the environment 100, although in other examples the vehicle 102 may be stationary (e.g., stopped at a stop sign, red light, etc.) and/or parked in the environment 100. In some examples, such as the illustrative example of FIG. 1, one or more objects may be present in the environment 100 that are associated with an audio perception event. An audio perception event, or simply audio event, may be any occurrence or happening related to sound and that may provide information about the environment 100. In the example illustrated in FIG. 1, an audio perception event may be any audible event that may be taken into consideration as the vehicle 102 traverses through the environment 100. Examples include emergency vehicle sirens, environmental condition sirens (e.g. tornado warnings), environmental conditions (e.g. rain, wind), railroad crossing bells, pedestrian crossing signals, crowd/pedestrian detections, other vehicles (e.g. engine noise, exhaust noise, horns honking), and human speech among other examples.

Although not illustrated, any number and/or type of objects associated with an audio perception event, including static objects, e.g., parked vehicles, buildings, or the like, and/or dynamic objects, e.g., pedestrians, animals, cyclists, trucks, motorcycles, other vehicles, or the like, can additionally or alternatively be present in the environment 100.

In some examples, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 102 may be configured to control all functions from start to stop, including all parking functions, it can be unoccupied. In some examples, the vehicle 102 may include a semi-autonomous vehicle configured to perform at least a portion of the control functions associated with vehicular operation.

In the example environment 100 illustrated in FIG. 1, an object associated with an audible perception event is a fire truck 106 emitting an audible siren 108. The sound generated by the siren 108 is indicated by the three concentric arcs directed towards the vehicle 102, though this is for illustration purposes, and it is understood that at least a portion of the siren may be directed away from the vehicle 102.

The vehicle 102 comprises, in this example, four microphones 110*a-d*. Each of the four microphones 110*a-d* may be configured to detect sound in the environment 100 in the vicinity of the vehicle 102 and generate respective audio data. Utilization of the four microphones 110*a-d* may increase audio perception accuracy compared to use of a single microphone. Further, a positioning of each of the microphones 110*a-d* with respect to the vehicle 102 may provide some level of directionality to the audio sensing capabilities owing to the finite speed of sound. Examples of determining direction of arrival based on audio sensor data are described in U.S. patent application Ser. No. 16/661,898 entitled "Emergency Vehicle Detection" and filed Oct. 23, 2023, the entire contents of which is incorporated herein by reference for all purposes. This may allow the vehicle 102 to not only become aware when an audio perception event is detected, but to gain some level of insight into a direction from which the audio perception event originated.

The vehicle 102 may be associated with a vehicle computing system 112. The vehicle computing system 112 may be similar to the vehicle computing device 804 and/or computing device(s) 832 shown in FIG. 8. At least some of the components of the vehicle computing system 112 may be local to the vehicle 102, remote from the vehicle 102, or distributed both locally and remotely from the vehicle 102. The vehicle computing system 112 may perform various functions in relation to the control of the vehicle 102. At least some of these functions may relate to perception. For instance, the vehicle 102 may comprise one or more sensors (including microphones 110*a-d*) which generate respective sensor data. The vehicle computing system 112 may process the sensor data to gain information about the environment 100 around the vehicle 102.

For example, the vehicle computing system 112 may be configured to perform audio perception event detection based on audio data generated by the microphones 110*a-d*. The vehicle computing system 112 may apply any suitable algorithm(s) to perform the detection, such as one or more machine learned models. For instance, processes for audio perception event detection may use one or more of the techniques in discussed in U.S. patent application Ser. No. 16/732,151 entitled "Emergency Vehicle Detection and Response" and filed Dec. 31, 2019, U.S. patent application Ser. No. 16/836,605 entitled "Distinguishing Between Direct Sounds and Reflected Sounds in an Environment" and filed Mar. 31, 2020, U.S. patent application Ser. No. 16/836,632 entitled "Detecting Occluded Objects Using Sound" and filed Mar. 31, 2020, U.S. patent application Ser. No. 18/523,189 entitled "Systems And Methods For Audio Data Adversity Detection" and filed Nov. 29, 2023, and U.S. patent application Ser. No. 17/952,604 entitled "Multi-Attention Machine Learning For Object Detection And Classification" and filed September 26, 202, the entire contents of which is incorporated herein by reference for all purposes.

There may be one or more algorithms available for each type of audio perception event. In such examples, a machine learned model for a certain audio perception event may be trained based on training data comprising a plurality of instances of the respective audio perception event. Each model may be applied to the audio data to generate an output indicative of whether a respective audio perception event was detected in the audio data. In some examples, at least one first, less resource intensive, algorithm may be applied to provide an indication that an audio perception event is likely to be present in audio data. Based on a determination that the audio perception event is likely to be present in the audio data, at least one second, more resource intensive, algorithm may be applied to the audio data to provide a more accurate indication of audio perception event detection.

An output of the algorithm(s) may be any suitable indication of audio perception event detection. In some examples, the indication may be a probability that an audio perception event was detected in the audio data. If the probability meets or exceeds a threshold probability, then it may be considered that a related audio perception event is present. Other examples indications include binary, a score, a metric, and alphanumeric indicators.

The vehicle computing system 112 may combine the audio generated by each of the four microphones 110*a-d* to form a multi-channel signal and process the signal. Alternatively, the audio may be processed separately as a plurality of single-channel signals. The vehicle computing system 112 may also process other types of sensor data in addition to the multi-channel audio signal. As discussed above, this approach may attempt to maximize accuracy of perception event detection, but is computationally intensive. Therefore, the techniques described herein involve processing data from a subset of all the microphones 110*a-d*. That is, while audio data may, or may not, be continually generated by each microphone, the vehicle computing system 112 may only process a subset of the audio data to perform audio perception event detection. The vehicle 102 may comprise a plurality of wiring, or cable, harnesses or wired communication paths. Each harness may couple one or more of the four microphones 110*a-d* to the vehicle computing system 112. In some examples, at least a pair of microphones may be coupled to the vehicle computing system 112 via a harness. Different ones of the microphones 110*a-d* may be coupled via different wiring harness, such as microphones 110*a*, 110*b* coupled via a first wiring harness and microphones 110*c*, 110*d* coupled via a second wiring harness.

At a first time, $T_1$, a first subset of microphones 110*a-b* may be determined or selected. In the example illustrated in FIG. 1, the first subset comprises a first microphone 110*a* and a second microphone 110*c* from the four microphones 110*a-d*. The first and second microphones 110*a*, 110*b* are shown as solid black rectangles in FIG. 1 to indicate that they are in the first subset, whereas a third microphone 110*b* and a fourth microphone 110*d* are shown as white rectangles to indicate that they are not in the first subset.

The determination of first subset may be a passive process, in that there does not need to be a change in how audio data is generated and obtained by the vehicle computing system 112. For example, audio data generated by each of the four microphones 110*a-d*, corresponding to audio detected over a certain time interval, may be obtained by the vehicle computing system 112 and the vehicle computing system 112 may select only audio data generated by microphones in the first subset. Alternatively, the vehicle computing system 112 may obtain only the audio data corresponding to the microphones 110*a*, 110*b* in the first subset. This may involve only activating the microphones 110*a*, 110*b* of the first subset for the certain time interval.

The first subset may comprise a predetermined selection of microphones. For instance, the vehicle computing system 112 may predetermine that the first and second microphones 110*a*, 110*c* were to form a subset of microphones at the first time. This predetermination may be to ensure that each microphone 110*a*-110*d* is sampled at least once in a given time interval, for example. In an example, at a previous time (e.g. before $T_1$), the vehicle computing system 112 may have selected the third and fourth microphones 110*b*, 110*d* to be in an earlier subset, so that the sampling is performed on alternating pairs of microphones ([110*a*, 110*c*], [110*b*, 110*d*]) over time. In this way, the scheduling of subsets may be following a round-robin format.

Determining microphones to form the first subset may be at least partially based on the wiring harnesses associated with each microphone 110*a-d*. For instance, the first and third microphones 110*a*, 110*c* may be selected to form the first subset based on the first and third microphones being associated with different wiring harnesses. This may improve resilience to wiring faults where audio data from a subset of microphones is processed.

Other examples of predetermined subset determination may become apparent when there are different numbers of microphones, or where the size of the subsets is different. In some examples, a subset may include as few as one microphone or may include as many as all the microphones. Microphones may then be selected in a random or round-robin fashion. Similarly, subsets comprising a fixed number of microphones may sample the microphones in a random or round-robin fashion in an attempt to sample the environment 100 omnidirectionally over a period of time. A previous subset may also include one or more of the microphones of the first subset.

Alternatively, or additionally, the first subset may comprise a dynamic selection of microphones 110*a*-110*d*. For instance, the first and second microphones 110*a*, 110*c* may have been selected to form the first subset based on one or more external factors. Such external factors may affect an effectiveness of a particular microphone, therefore making it more or less useful to include in a subset.

An example factor includes map data indicating a location of the vehicle 102 with respect to a map. For instance, map data may indicate a location of a railroad crossing comprising an audible signal alert warning when a train is expected to cross a road. Based on the map data, it can be determined when the vehicle 102 is approaching the railroad crossing and therefore microphones towards the front of the vehicle 102 (e.g. the third microphone 110*b*) may be selected within a subset more often than microphones on the side or rear of the vehicle 102 (e.g. the first, second and fourth microphones 110*a*, 110*c*, 110*d*), at least where railroad crossing detection is concerned. Sampling audio data from a particular microphone more often may be one example of foveation techniques that are possible using the techniques described herein.

Another example factor is environmental conditions. For instance, wind may impact the effectiveness of microphones depending on their position, such as a microphone positioned on a windward side of the vehicle 102. In this scenario, such a microphone may be sampled less and so included in a subset less often, since the audio data it generates may be less useful in an audio perception event detection. Effectiveness of a microphone may, in some examples, be determined by determining a confidence of audio event detection by a microphone in a subset. Based on the confidence, it may be determined that the microphone is not to be in a later subset of microphones.

Dynamic selection of a subset may be at least partially based on a type of audio perception event that is being detected. For instance, where an emergency vehicle siren has not yet been detected, siren detection may be more effective when microphones positioned on the front and rear of the vehicle are sampled more often, since an emergency vehicle might be expected to approach the vehicle 102 from in front of, or behind, the vehicle 102.

In some examples, audio data from all the microphones 110*a-d* may be processed at a certain frequency. Then, based on the processing, and perhaps data generated by one or more other sensors, the first subset of microphones 110*a-d* may be determined.

In any case, the first and second microphones 110*a*, 110*c* are determined to form the first subset, and at least a portion of the audio data generated by each of the first and second microphones 110*a*, 110*c* is processed to determine a first indication that an audio perception event is present in the environment. As described above, the vehicle computing system 112 may process audio data generated by the first and second microphones 110*a*, 110*c*, using any suitable algorithm, to provide an output indication that an audio perception event is detected.

The audio data generated by each of the microphones 110*a*, 110*b* of the first subset may correspond to sound received over a fixed, or variable time interval. In some examples, the time interval may be approximately equal to, greater than, or less than the time interval between subset selection. Where the time interval over which sound is received is greater than the time interval between subset selection, there may be redundancy in the audio data generated by consecutive subsets. This may improve accuracy at the cost of compute resource utilization. The time interval over which sound is received itself may be predetermined to balance between accuracy and computational efficiency. The predetermination may, in some examples, be learnt using one or more machine learning models.

In some examples, the time interval over which sound is received may be dependent on processing of audio data from previous subsets. For instance, where at a previous time it has been determined that it is unlikely that an audio perception event is present, the time interval over which sound is received may be decreased for a current subset because it may be more likely that the audio perception event is not going to be present at the later time. This may further reduce compute resource utilization. At a time when it is determined that an audio perception event is likely present, the time interval over which sound is received may be increased to improve tracking of the audio perception event.

Processing audio data generated by a sub-selection of microphones may cause the overall accuracy of detection may decrease due to fewer samples being processed. However, the lower computational resource use and/or lower computational latency may more than offset any reduction in accuracy. Furthermore, because the audio data generated by each of the full set of microphones 110*a-d* is likely to indicate the presence of the fire truck 106 due to the fire truck's proximity to the vehicle 102, then accuracy may not actually be impacted. Selecting a subset of microphones

110*a*, 110*c* as illustrated in FIG. 1 may therefore increase computational efficiency without affecting accuracy or safety.

In some examples, the detection of the siren 108 at the first time may allow the vehicle computing system 112 to select a more optimal subset for a later detection of the siren 108, that maintains (or even further improves) the computational efficiency gains while perhaps increasing accuracy of the detection. FIG. 1 further illustrates an example of this. In particular, at a later time, $T_2$, a second subset of microphones is determined, thereby necessitating fewer computational resources and/or allowing more computational resources to be dedicated to processing the determined channels. The second subset comprises the second microphone 110*c* and the third microphone 110*d*. The second subset may have been selected dynamically, and responsive to a detection of the siren 108 from a direction of the fire truck 106 at the first time, $T_1$. In particular, the detection of the siren 108 by the first subset may be at least partially used to determine an approximate location from which the siren 108 originated.

For example, a difference in time between detection of the siren 108 at the first and second microphones 110*a*, 110*c* at $T_1$ may be used to triangulate approximate directions from which the siren 108 may have originated. Current conditions (temperature, wind speed, wind direction, altitude etc.), measured by sensors associated with the vehicle 102 and/or provided remotely, may be used to calculate a local speed of sound in the vicinity of the vehicle 102 thus improving the accuracy of such a determination.

In some examples, the processing of the first data may indicate a doppler shift in the detected siren 108, indicating a relative velocity of the siren 108 with respect to the vehicle 102, and further providing an indication of the direction from which the siren 108 originated. In some examples, the determined direction from which the siren 108 originated may be combined with map data to indicate that the siren 108 belongs to a vehicle (i.e. the fire truck 106) traversing the road 104 in a direction opposite from that of the vehicle 102. The indication of relative velocity of the siren 108 may also be utilized to track a trajectory of the fire truck 106, so that the fire truck's approximate location can be estimated at a future time.

As discussed, the microphones 110*a-d* may be part of a wider sensor system associated with the vehicle 102 and may provide a single modality from a plurality of modalities that may be used to gain information about the environment 100 in the vicinity of the vehicle 102. For instance, the vehicle 102 may be associated with one or more of the following sensors: location, inertial, LIDAR, radar, sonar, infrared, image, environmental, temperature, some of which may or may not be remote from the vehicle 102. In some examples then, the siren detection at $T_1$ may be combined with at least one other type of sensor data to provide an indication of the direction from which the siren 108 originated. The other type of sensor data may be processed to identify the fire truck 106. Then, combined with the approximate possible locations of the siren 108 detected by the first and second microphones 110*a*, 110*c* at $T_1$, the second subset may be determined.

The vehicle computing system 112 may comprise a component configured to track one or more objects in the environment, perhaps by using sensor data obtained by one or more sensors associated with the vehicle 102. An example is the perception component 818 of the vehicle 802 shown in FIG. 8. The result of processing the first data may be combined with the output of such a perception component to enhance tracking capabilities. For instance, in the example above, the sound detected by the first subset may indicate an approximate direction of the siren 108, and this may be used in combination with the output of the perception component to better track the fire truck 106 from which the siren 108 is being emitted. This may better inform a selection of microphone subsets at a later time since a future location of the fire truck 106 may be better estimated.

Based on the determination that the siren 108 originated from a direction corresponding to the fire truck 106 at $T_1$, the second and third microphones 110*c*, 110*b* may be selected to form the second subset. Second audio data generated by the second and third microphones 110*c*, 110*b* may be expected to provide a higher probability of subsequent detection of the siren 108 due to their relative positions on the vehicle 102, compared with the first and fourth microphones 110*a*, 110*d*.

In some examples, at least a portion of the second data may be processed to determine a second indication that the audio perception event is present in the environment 100. Based on at least one of the first and second indications, the vehicle 102 may be controlled. For instance, determination that it is highly likely that the siren 108 is detected may be at least partially used by the vehicle computing system 112 to generate instructions that cause the vehicle 102 decelerate or possibly change direction.

The time interval between the first time, $T_1$, and the second time, $T_2$, denoted $\Delta T$ (e.g., the time between switching microphones), may be a fixed or dynamic time interval. In an example, the time interval $\Delta T$ may correspond to an integer multiple of a time at which updated instructions are provided to control the vehicle. In another example, the time interval $\Delta T$ may be a predetermined interval, such as 10 ms, 100 ms, 1s etc. In another example, $\Delta T$ may be determined dynamically. In some examples, $\Delta T$ may be based on the first indication. For instance, if the first indication indicates that the audio perception event (e.g. siren 108) is present in the environment 100, then the time interval $\Delta T$ may be reduced to ensure that the audio perception event is monitored at a higher sampling rate, or resolution. $\Delta T$ may be also, additionally or alternatively, be determined dynamically based on external factors such as map data. For instance, where map data indicates that the vehicle 102 is approaching a railroad crossing, $\Delta T$ may be reduced to increase the sampling rate of the environment 100, perhaps in addition to sampling the front (i.e. third) microphone 110*b* in a subset more often. $\Delta T$ may be determined dynamically based on environmental conditions. For instance, where weather conditions, such as heavy rain or wind, affect detection accuracy, $\Delta T$ may be reduced to increase the sampling rate.

The duration of audio associated with the second data may be dependent on the processing of the first data. In other words, the time interval over which sound is received by the microphones 110*a*, 110*b* in the second subset may be dependent on the first indication. For example, since it has been determined that it is likely that the siren 108 is present in the environment based on the first indication, the amount of data received from the second subset may be increased compared to the amount of data received from the first subset. This increase in the amount of data may allow for improved tracking of the siren 108 by increasing the amount of time over which the second subset is sampled.

Alternatively, since it has been determined that it is likely that the siren 108 is present in the environment based on the first indication, a duration of audio received from the second subset may be reduced compared to a duration of audio received from the first subset. In this example, it may be likely that the siren 108 is detectable from less audio and so compute resource utilization can be further reduced while still maintaining acceptable audio perception event detection performance.

In some examples, the rate at which the audio data generated by the second subset is sampled may be dependent on the first indication. In one example, the audio data generated by the second subset may be sampled at a higher rate such as when it has been determined that it is likely that the siren 108 is present in the environment based on the first indication. In another example, the audio data generated by the second subset may be sampled at a lower rate, such as when it has been determined that the siren 108 is not present based on the first indication. In these examples, the sampling rate may be maintained at a rate sufficient to identify an audio event.

FIG. 1 illustrates an example scenario where the microphones 110*a*-110*d* in any given subset may be dynamically selected. However, this is just one example. As described above, the second subset could be predetermined, possibly according to a random or round-robin schedule, or based on the microphones in a given subset being associated with different wiring harnesses etc. In these examples, a computational efficiency gain is realized without having a substantial impact on detection accuracy.

As explained above, audio data may be generated by every microphone 110*a*-110*d* at approximately each time $T_1$, $T_2$ so that the determination of the first and second subsets need not occur at the first and second times $T_1$, $T_2$. This may facilitate dynamic selection of the subsets since all the audio data required to form any possible subset may already be obtained and be available for processing. Further, applying the above-described techniques may require only minor software modifications to be implemented in a conventional multi-microphone system.

In some examples, the first and second data may be processed at the same time, perhaps if the first and subsets are predetermined. This may prevent the need to perform audio perception detection as regularly, further impacting computational resource availability and latency.

In some examples, the first indication may be utilized to form the second subset at the second time, $T_2$, but the audio data obtained from the second subset may correspond to a time interval that includes, or even precedes, the first time, $T_1$. Since the audio data from each microphone may be continually generated, the techniques herein allow for the vehicle computing system 112 to process audio data from any desired time in the past. In other words, since it has been determined that it is likely that the siren 108 is present in the environment at $T_1$ based on the first indication, audio data from second subset may be obtained that corresponds to a time interval over which the audio data from the first subset was obtained. This may increase the spatial information that can be obtained by utilizing the audio data generated by a higher number of microphones at a particular time, thereby increasing accuracy. Further, by selecting, at a later time, audio data from around $T_1$ only in certain circumstances allows for a reduction in compute resource utilization overall. This also distributes processing of the audio data generated by a higher number of microphones over different times.

In some examples, the first indication may be obtained via a first algorithm and the second indication may be obtained via a second algorithm. The first algorithm may be a relatively low complexity algorithm utilizing a relatively low amount of computational resources, whereas the second algorithm may be a relatively high complexity algorithm utilizing a relatively high amount of computational resources. The first algorithm may be less accurate in providing an indication of a present audio perception event, but may provide enough of an indication to warrant further investigation using the higher complexity algorithm, which may provide a more accurate indication of the presence of the audio perception event.

In some examples, the first indication may be based on an energy (e.g. energy spectral density, sound pressure level, or the like) associated with one or more audio signals generated by the microphones in the first subset. In this context, the first indication may be referred to as a metric and may only provide a rudimentary indication of the presence of the audio perception event. Where a microphone in the first subset has an energy that meets or exceeds a threshold energy, it may be determined to be in the second subset, and the audio data obtained from that microphone may be processed using the higher complexity algorithm.

The first algorithm may be configured to determine a confidence, or uncertainty, in the audio data generated by the first subset, or in other words, how well microphones in the first subset are detecting sound. The determined confidence may be used to determine whether one or more microphones are to be in the second subset. For instance, where there is high uncertainty in a microphone in the first subset, the same microphone may be determined to be in the second subset to reduce the total uncertainty in audio detection from that microphone. Alternatively, where there is high uncertainty in the microphone in the first subset, the same microphone may be determined not to be in the second subset since its higher uncertainty may have an effect on overall audio perception event detection.

While there are four microphones 110*a-d* present in the example illustrated in FIG. 1, it is understood that the procedures described herein are applicable where there are any number of microphones greater than one. This includes such microphones systems as microphone arrays wherein a single array may include a plurality of microphones. Similarly, the subsets may be of any size at any given time. In examples, a subset may include all the microphones 110*a*-110*d*, none of the microphones 110*a*-110*d*, or less than all of the microphones 110*a*-110*d* (i.e. a proper subset of microphones).

FIGS. 2-6 illustrate further examples of microphone sub-selection for a variety of example scenarios 200-600. For each example scenario 200-600, a vehicle 202 is illustrated comprising six microphones 204*a-e* that are positioned around the edge of the vehicle 202. The vehicle 202 may be similar to the vehicle 802 illustrated in FIG. 8 and may be associated with a vehicle computing system that receives audio data generated by one or more of the six microphones 204*a-e* to perform audio event detection. As above, microphones 204*a-e* forming a subset at a given time are indicated as such by being shown as solid black rectangles. Microphones 204*a-e* not forming a part of a subset are indicated as such by being shown as white rectangles.

Figure 2:
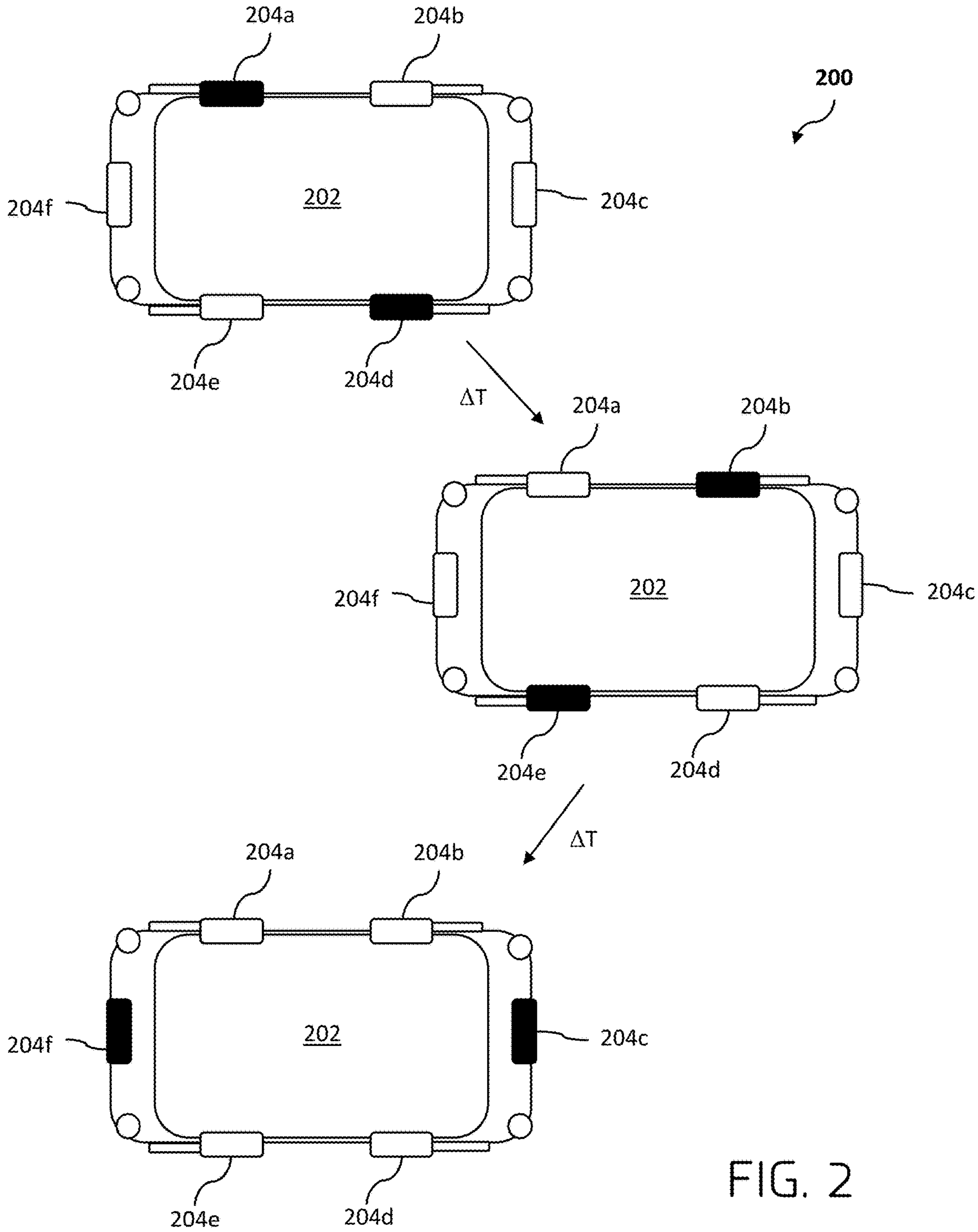
FIG. 2 shows an example microphone sub-selection process according to a first example.

FIG. 2 shows an example scenario 200 wherein subsets are determined to follow a preselected, cyclic, sequence. For example, at a first time, first and fourth microphones 204*a*, 204*d* form a first subset. Audio data generated by at least one of the first and fourth microphones 204*a*, 204*d* may be processed to determine a first indication that an audio event is detected in an environment around the vehicle 202.

In the example scenario 200, the first and fourth microphones 204*a*, 204*d* may be selected to form the first subset based on their positioning with respect to the vehicle 202.

For instance, because the first and fourth microphones 204*a*, 204*d* are positioned on opposite sides of the vehicle 202 from one another, the audio data generated may increase the spatial information obtained.

At a second, later time, second and fifth microphones 204*b*, 204*e* form a second subset. The second and fifth microphones 204*b*, 204*e* may be selected to form a second subset based on their positioning on the vehicle 202. Audio data generated by at least one of the second and fifth microphones 204*b*, 204*e* may be processed to determine a second indication that an audio event is detected in an environment around the vehicle 202. At a third, even later time, third and sixth microphones 204*c*, 204*f* form a third subset. Audio data generated by at least one of the third and sixth microphones 204*c*, 204*f* may be processed to determine a third indication that an audio event is detected in an environment around the vehicle 202. The subsets may then continue to follow the same sequence of subsets.

In this example scenario 200 it is understood that the processing of the audio data corresponding to the first, second and third subsets may occur at any time. For instance, the processing of the audio data corresponding to the first subset need not occur before the processing of the audio data corresponding to the second subset. In some examples, the audio data corresponding to the first, second and third subsets may be processed substantially simultaneously. In some examples, the audio data corresponding to the first subset may even be processed after the audio data corresponding to the second subset. In other examples, processing of the subsets occurs soon after the relevant time to reduce latency.

In the example scenario 200, each time a subset is processed, a third of the processing resources may be used compared to a conventional process that involves processing data from each microphone 204*a-e* at each time. Furthermore, as audio data from each of the microphones 204*a-e* is processed over the course of a "full cycle" illustrated in FIG. 2, spatial information relating to the environment can still be obtained. Owing to potential redundancy in the audio data generated by each of the microphones 204*a-f*, accuracy may also not be substantially impacted.

Figure 3:
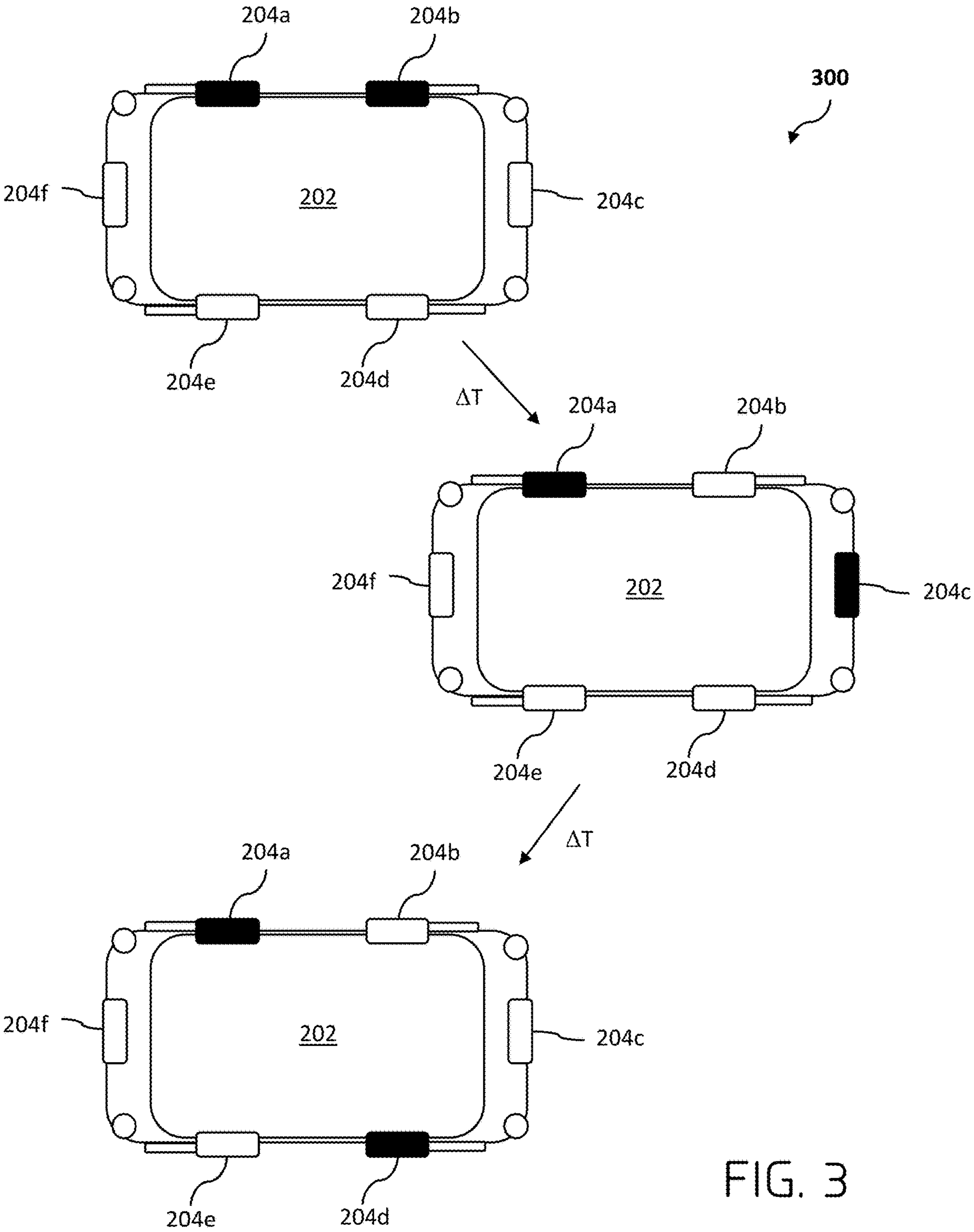
FIG. 3 shows an example microphone sub-selection process according to a second example.

FIG. 3 shows a further example scenario 300 wherein subsets are predetermined based on a round-robin format. At a first time, the first and second microphones 204*a*, 204*b* form a first subset. Audio data generated by at least one of the first and second microphones 204*a*, 204*b* may be processed to determine a first indication that an audio event is detected in an environment around the vehicle 202. At a second, later time, the first and third microphones 204*a*, 204*c* form a second subset. Audio data generated by at least one of the first and third microphones 204*a*, 204*c* may be processed to determine a second indication that an audio event is detected in an environment around the vehicle 202. At a third, even later time, the first and fourth microphones 204*a*, 204*d* form a third subset. Audio data generated by at least one of the first and fourth microphones 204*a*, 204*d* may be processed to determine a third indication that an audio event is detected in an environment around the vehicle 202. Although not illustrated, the sub-selections continue according to the round-robin scheduling so that all of the second to sixth microphones 204*a-f* are part of a respective subset with the first microphone 204*a* in turn. The second microphone 204*b* may then form subsets with each of the third to sixth microphones 204*c-f*, and possibly the first microphone 204*a* again, and so on. It will be understood that other forms of round-robin scheduling may be used, for example using subsets with three, four or more microphones as members. In general, round robin scheduling allows all combination of microphones to form a respective subset over time.

As in the example scenario 200, the processing of audio data corresponding to the first, second and third subsets may occur at any time since later-determined subsets are not determined based on processing of audio data corresponding to an earlier subset.

In this example scenario 300, similar to the example scenario 200 illustrated in FIG. 2, each time a subset is processed, a third of the processing resources may be used compared to a conventional process that involves processing data from each microphone at each time. Furthermore, as data from each of the microphones 204*a-e* is processed over the course of a period illustrated in FIG. 3, spatial information relating to the environment can be obtained.

Figure 4:
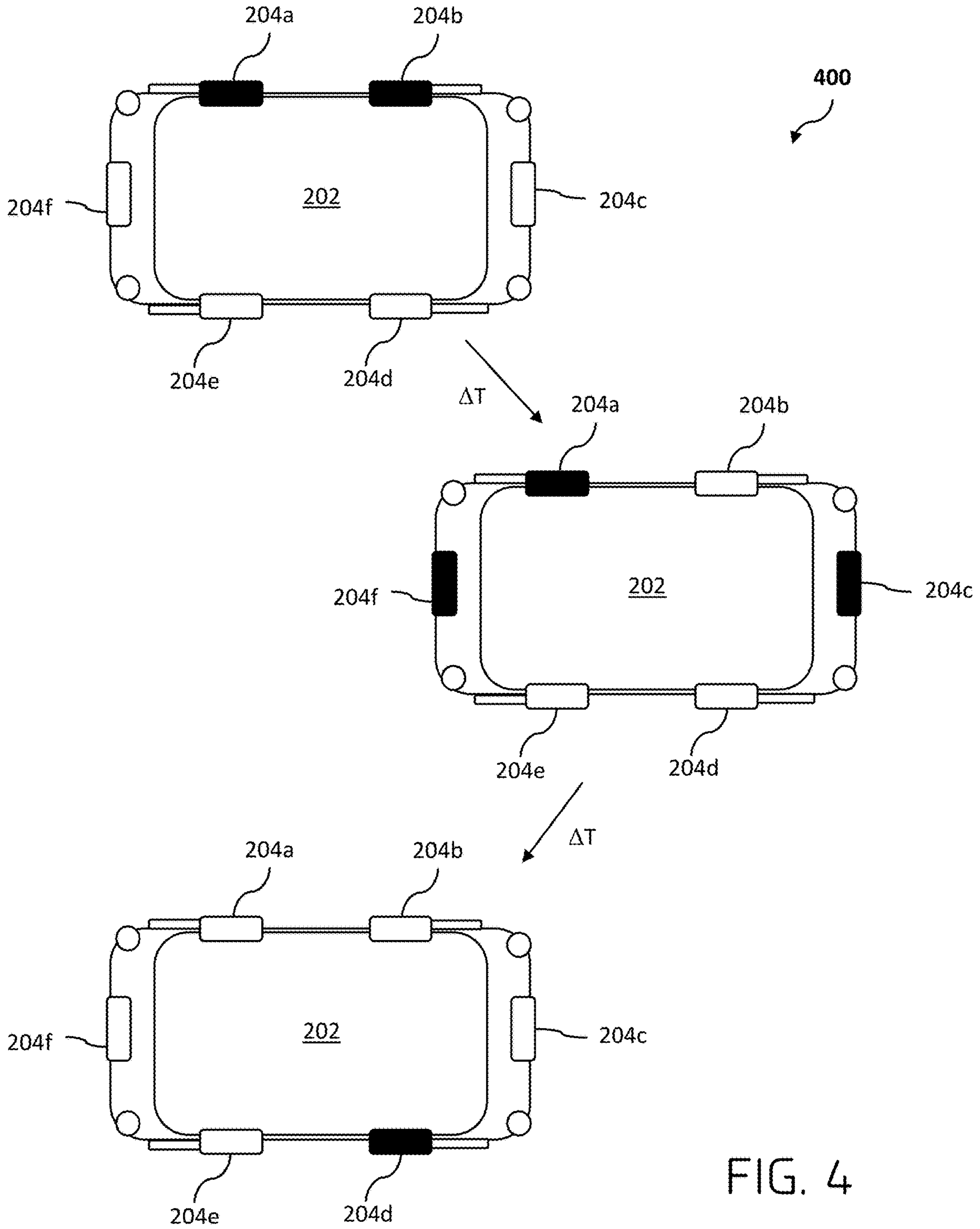
FIG. 4 shows an example microphone sub-selection process according to a third example.

FIG. 4 shows a further example scenario 400 wherein subsets are determined randomly. At a first time, the first and second microphones 204*a*, 204*b* form a first subset. Audio data generated by at least one of the first and second microphones 204*a*, 204*b* may be processed to determine a first indication that an audio event is detected in an environment around the vehicle 202. At a second, later time, the first, third and sixth microphones 204*a*, 204*c*, 204*f* form a second subset.

In this example scenario 400, the selection of microphones to form each subset is random. In some examples, the random selection may involve assigning a random number to each microphone 204*a-e* and selecting those microphones having assigned random numbers at or above a threshold value. The result of this process is that subsequent subsets may comprise different numbers of microphones, as in the example scenario 400 illustrated in FIG. 4. Other processes for random selection are possible. For example, a number of microphones to form each subset may be fixed, so that the random selection involves randomly selecting the fixed number of microphones from all of the microphones.

In the examples scenario 400, audio data generated by at least one of the first, third and sixth microphones 204*a*, 204*c*, 204*f* may be processed to determine a second indication that an audio event is detected in an environment around the vehicle 202. At a third, even later time, another random selection of microphones 204*a-e* is performed, resulting the fourth microphone 204*d* forming a third subset. Audio data generated by the fourth microphone 204*d* may be processed to determine a third indication that an audio event is detected in an environment around the vehicle 202. Again, the processing of audio data corresponding to the first, second and third subsets may occur at any time since the random selection of microphones to form the first, second and third subsets may take place performed before any audio processing takes place.

Figure 5:
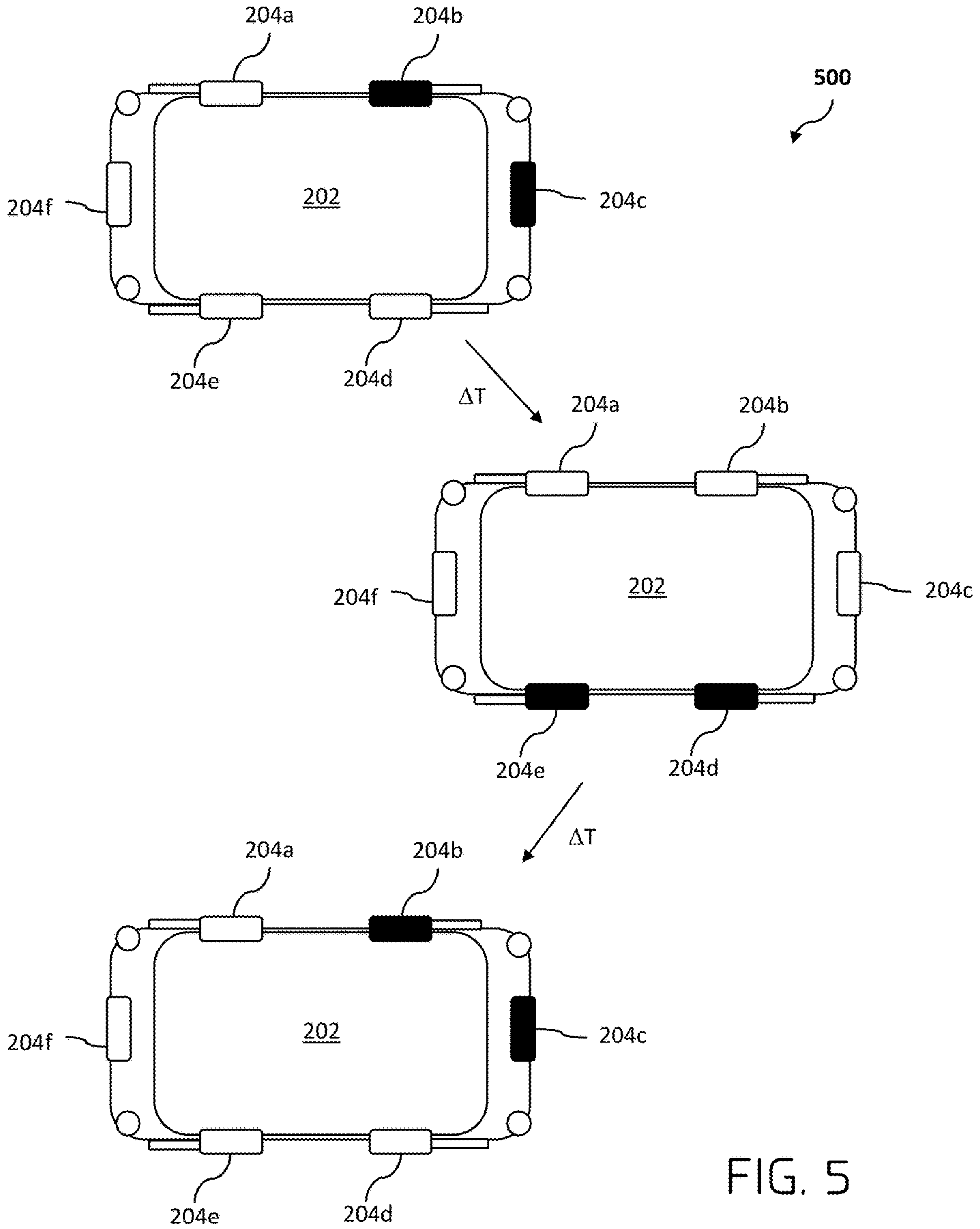
FIG. 5 shows an example microphone sub-selection process according to a fourth example.

FIG. 5 shows a further example scenario 500 wherein subsets are determined dynamically, perhaps in response to an external factor such as map data, environmental conditions, detections present in other sensor modalities (e.g., lidar, radar, cameras, etc.) and/or other sensors external to the vehicle (e.g., V2X, DSRC, etc.), other sensor data or a predetermination of an audio event detection. In the example scenario 500, at a first time, the second and third microphones 204*b*, 204*c* form a first subset. The first subset in this scenario 500 may be predetermined (as in FIGS. 2 and 3) or dynamically determined, perhaps based on an external factor indicating that an audio event is possible in a direction corresponding to the second and third microphones 204*b*, 204*c*. Audio data generated by at least one of the second and third microphones 204*b*, 204*c* may be processed to determine a first indication that an audio event is detected in an environment around the vehicle 202. The first indication may indicate that the audio event is present (e.g. the indication meets or exceeds a threshold indication).

At a second, later time, the fourth and fifth microphones 204*d*, 204*e* form a second subset. Audio data generated by at least one of the fourth and fifth microphones 204*d*, 204*e* may be processed to determine a second indication that an audio event is detected in an environment around the vehicle 202. The second indication may indicate that the audio event was detected, but that the detection was weaker compared with the detection from the first subset. Accordingly, at a third, even later time, the second and third microphones 204*b*, 204*c* may be determined to form a third subset, since it may be likely that to receive a stronger detection using these microphones 204*b*, 204*c*. In this way, while accuracy may initially be reduced due to less audio data being processed, the dynamic selection of subsets may be adapted to current conditions to optimize accuracy using smaller data sets, all while improving computational efficiency.

Figure 6:
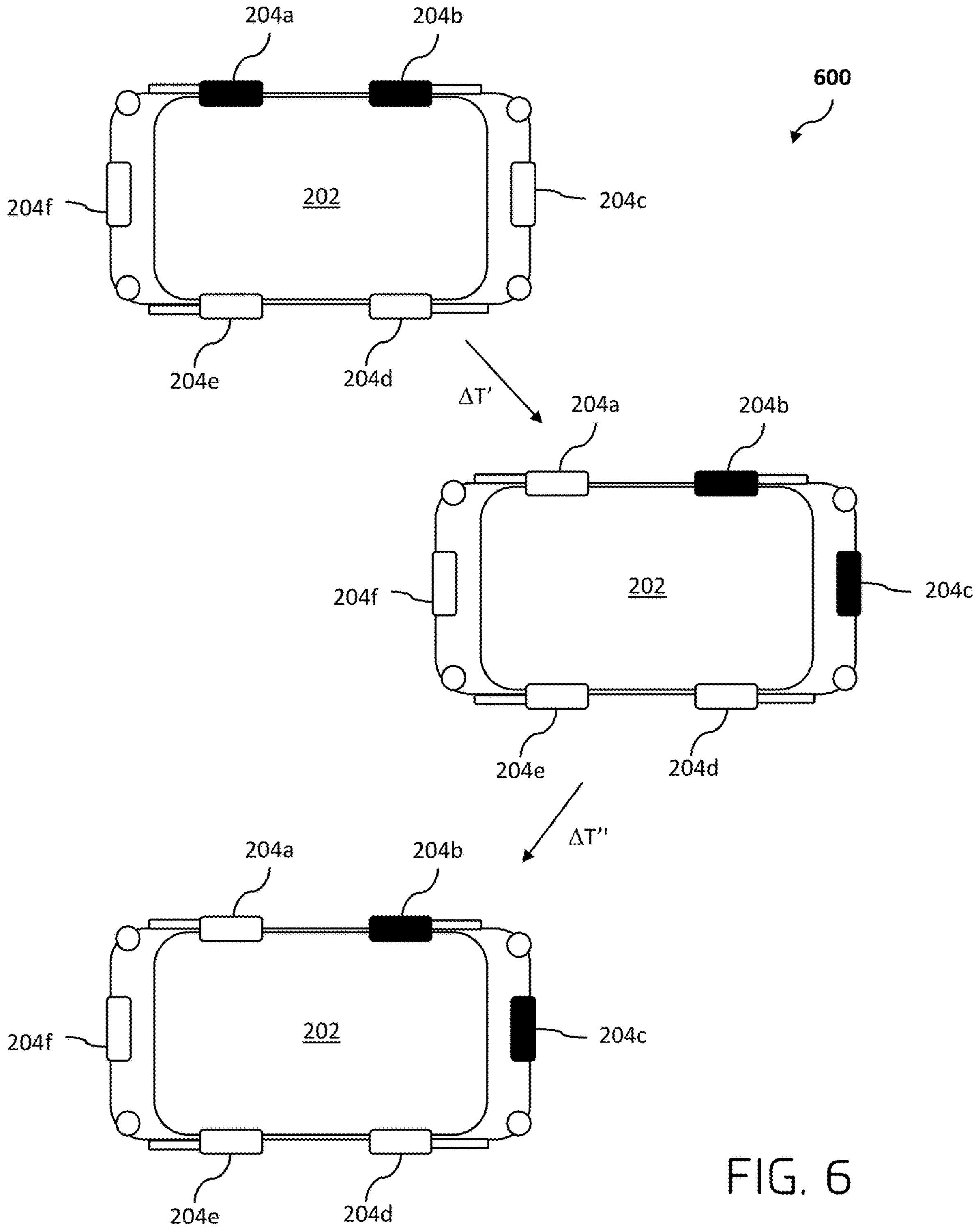
FIG. 6 shows an example microphone sub-selection process according to a fifth example.

FIG. 6 shows a further example scenario 600 wherein a time interval between successive subset formation/determinations is dynamically modified based on current conditions, again, perhaps in response to an external factor such as map data, environmental conditions, other sensor data or a predetermination of an audio event detection. In the example scenario 600, at a first time, the first and second microphones 204*a*, 204*b* form a first subset. The first subset in this scenario 600 may be predetermined (as in FIGS. 2 and 3) or dynamically determined, perhaps based on an external factor indicating that an audio event is possible in a direction corresponding to the first and second microphones 204*a*, 204*b*. Audio data generated by at least one of the first and second microphones 204*a*, 204*b* may be processed to determine a first indication that an audio event is detected in an environment around the vehicle 202.

At a second, later time, second and third microphones 204*b*, 204*c* form a second subset. The second, later time, may be a first time interval ΔT' after the first time, which may be predetermined. Audio data generated by at least one of the second and third microphones 204*b*, 204*c* may be processed to determine a second indication that an audio event is detected in an environment around the vehicle 202. In this example scenario 600, the second indication may indicate that an audio event is present. Accordingly, at a third, even later time, the second and third microphones 204*b*, 204*c* form a third subset. The third, later time, may be a second time interval ΔT" after the second time, that is shorter than the first time interval ΔT'. This may allow the vehicle computing system to more closely monitor the audio event by sampling audio data at a higher rate. While in the example scenario 600, the second and third subsets are the same. However, it is understood that the second and third subsets could be different while the first and second time intervals ΔT', ΔT" could also be different.

Figure 7:
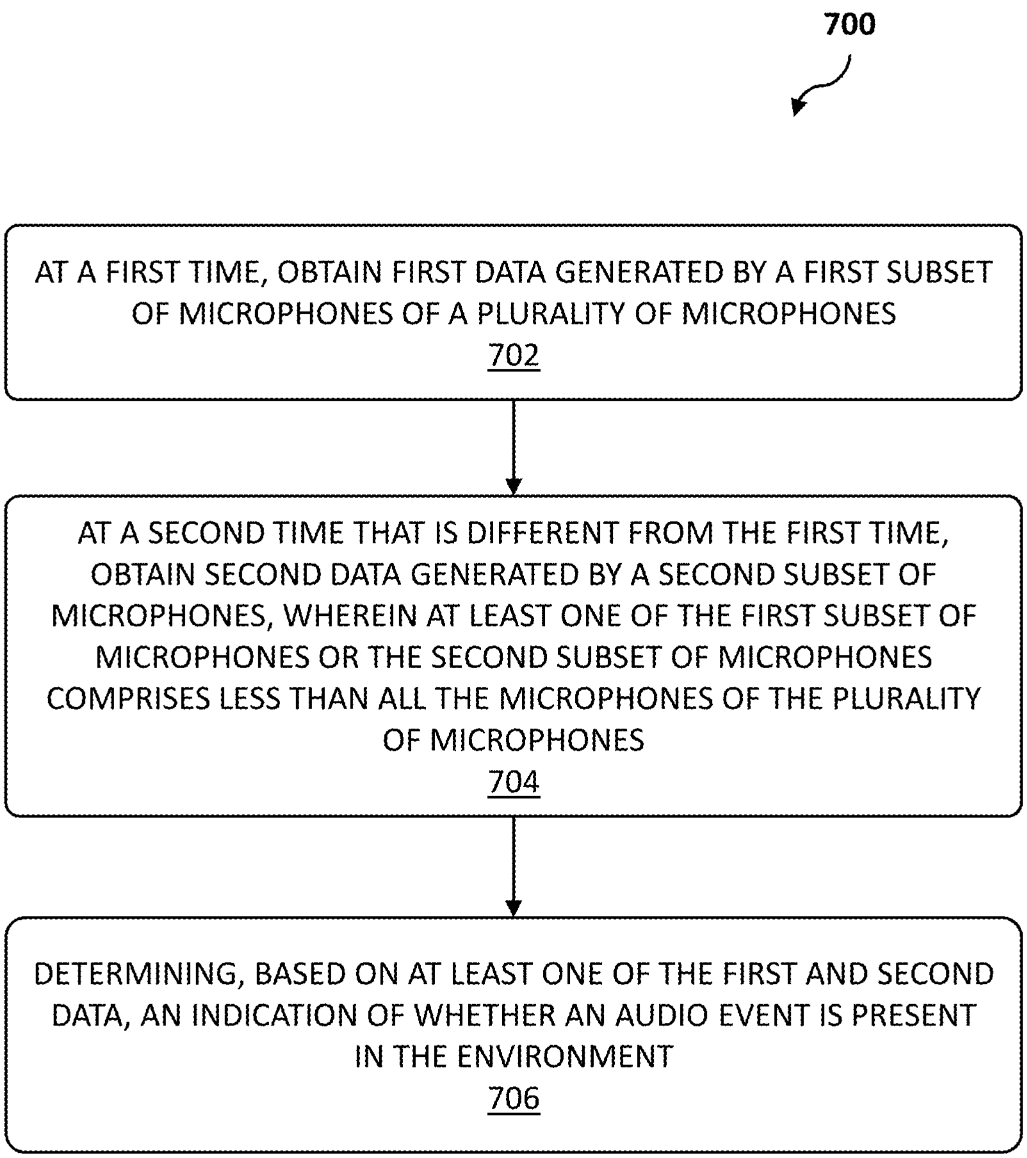
FIG. 7 depicts an example process for sub-selecting microphones, in accordance with examples of this disclosure.

It is understood that the example scenarios 200-600 illustrated in FIGS. 2-6 are not exhaustive. FIG. 7 depicts a general example process 700 for performing microphone sub-selection from a plurality of microphones, of which the scenarios 200-600 are but examples. Some or all of the process 700 may be performed by one or more components in FIG. 8, as described herein. For example, some or all of the process 700 may be performed by the vehicle computing device(s) 804.

At operation 702, the process 700 comprises at a first time, obtaining first data generated by a first subset of microphones of a plurality of microphones associated with an autonomous vehicle in an environment. The first data may be obtained as it is generated by the first subset of microphones, or obtained at some later time. As described above, in some examples, data generated by each of the plurality of microphones may be received and stored in storage. Data from the first subset may then be obtained from the full set of data in storage. In another example, microphones forming the first subset may be selected, and only data generated by those microphones may be obtained. The first subset may be determined in any of the example procedures described herein. For example, the first subset may be predetermined or dynamically determined.

At operation 704, the process 700 comprises at a second time that is different from the first time, obtaining second data generated by a second subset of microphones of the plurality of microphones, wherein at least one of the first subset of microphones or the second subset comprises less than all of the microphones of the plurality of microphones.

The determination of microphones forming the second subset may predetermined, performed based on processing of the first data or based on one or more external factors as discussed herein. For example, the first subset of microphones may comprise a first microphone, and determining at least one of the first microphone and a second microphone to be in the second subset of microphones may be based on the first microphone being in the first subset of microphones. In examples, the first subset of microphones may comprise a first number of microphones and the second subset of microphones may comprise a second number of microphones different from the first number. Determining a first microphone and second a second microphone to be in the first subset of microphones may be based on respective positions of the first microphone and the second microphone. Determining a microphone to be in the first subset or the second subset may be based on data generated by a sensor associated with the autonomous vehicle, the sensor being different from the plurality of microphones. Determining a microphone to be in the first subset or the second subset may be based at least in part on one or more of: map data, environmental conditions, a detection of an event associated with the audio event based on data generated by a sensor different from the plurality of microphones, or that the first or second data is to be combined with data generated by a sensor different from the plurality of microphones to perform perception event detection. For example, it may be desired to combine processing of audio data with image data, where the audio data is generated by a microphone comprising a similar directionality to a camera generating the image data.

In some examples, an uncertainty may be determined associated with data generated by a microphone in the first subset of microphones. Based on the uncertainty, the microphone may be determined to be in the second subset. For instance, where there may be uncertainty in a certain direction at the first time, it may be beneficial to include one or more microphones in that direction in the second subset. Alternatively, when uncertainty is low, it may be advantageous to continue with that microphone to improve audio event detection performance, as in similar foveation techniques applied in image processing. The uncertainty may be compared to a threshold and/or accumulated, averaged or otherwise processed over time.

In some examples, based on the first data, it may be determined that a likelihood that the audio event is present in the environment meets or exceeds a threshold likelihood. Based on this, a microphone in the first subset may also be selected to be in the second subset. In some examples, a less computationally intensive algorithm may be determine the likelihood.

At operation 706, the process 700 comprises determining, based on at least one of the first and second data, an indication that an audio event is present in the environment. As discussed, processing of the first data may occur before, at the time of, or after obtaining the second data. It may be determined that the indication that the audio event is present in the environment meets or exceeds a threshold indication. The autonomous vehicle may then be controlled based at least in part on the determining that the indication that the audio event is present in the environment exceeds a threshold indication.

Where the indication is determined based on at least the first data, a time interval between the first and second times may be determined based at least in part on the indication. For example, where an audio event is likely to have been detected in the first subset, the time interval may be reduced to monitor the audio event.

The first data may be processed using a first algorithm and the second data may be processed using a second algorithm. The first algorithm may be a relatively low complexity algorithm whereas the second algorithm may be a relatively high complexity algorithm. The first algorithm may output a metric based on the first data. If the metric meets or exceeds a threshold metric, then certain microphones may be determined to form the second subset, and their generated audio data may be processed using the higher complexity algorithm. In some examples, the first subset may comprise all of the plurality of microphones. Then based on the output of the first algorithm based on the first data, the second subset may be determined based on, for example, those microphones that generated audio data that meets or exceeds the threshold metric, or a fixed number of microphones having the highest metrics etc. The output of the second algorithm may then comprise the indication.

Figure 8:
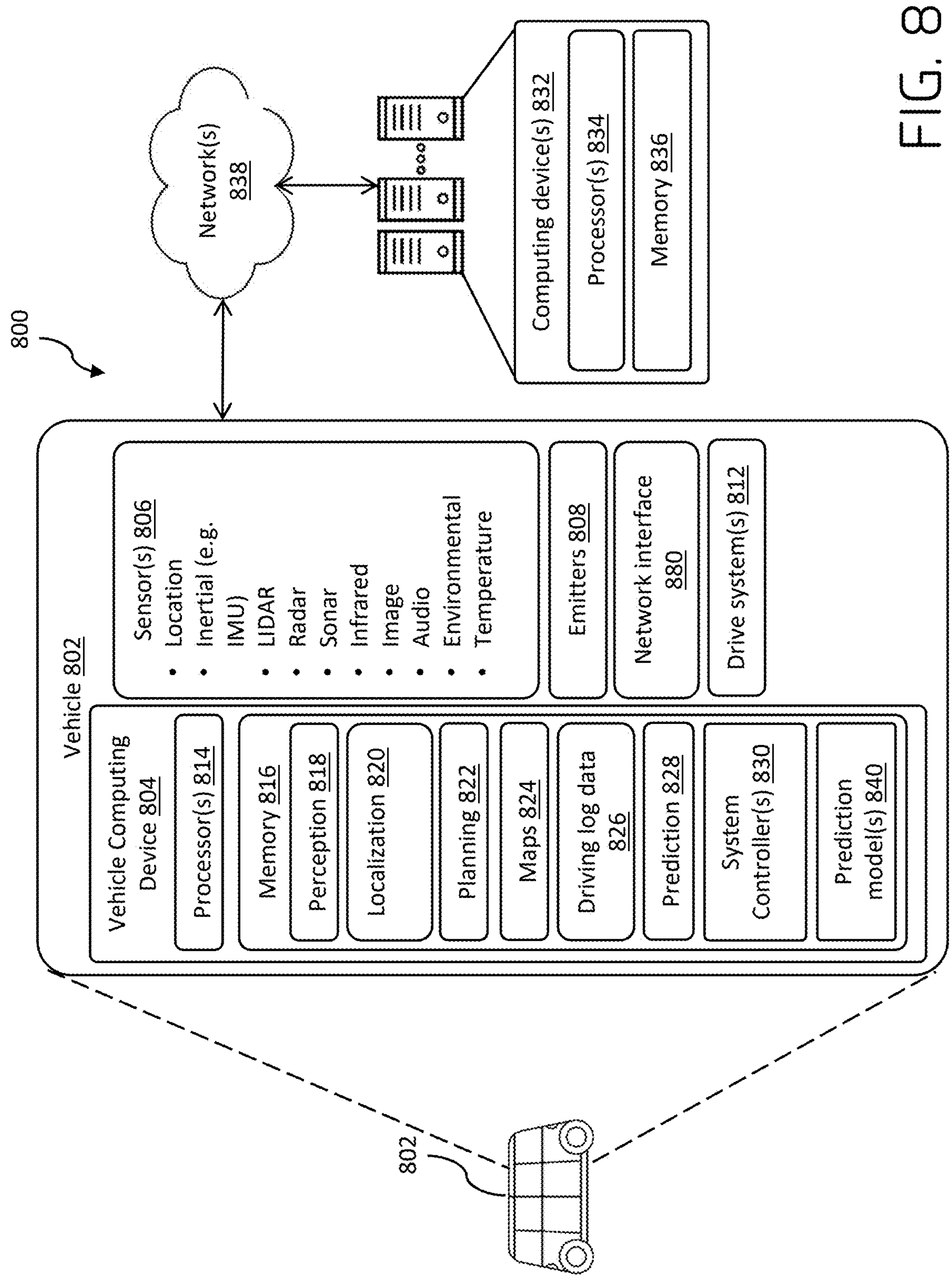
FIG. 8 is a block diagram of an example system for implementing the techniques described herein.

FIG. 8 illustrates a block diagram of an example system 800 that implements the techniques discussed herein. FIG. 8 may represent vehicle 102 and the described computing system 112 of FIG. 1 and/or the vehicle 202 of FIGS. 2-6. In some instances, the example system 800 may include a vehicle 802. In some instances, the vehicle 802 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 802 may be a fully or partially autonomous vehicle having any other level or classification. Moreover, in some instances, the techniques described herein may be usable by non-autonomous vehicles as well.

The vehicle 802 may include a vehicle computing device(s) 804, sensor(s) 806, emitter(s) 808, network interface(s) 810, and/or drive system(s) 812. The system 800 may additionally or alternatively comprise computing device(s) 822. In some instances, the sensor(s) 806 may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 806 may include multiple instances of each of these or other types of sensors. For instance, the radar sensors may include individual radar sensors located at the corners, front, back, sides, and/or top of the vehicle 802. As another example, the cameras may include multiple cameras disposed at various locations about the exterior and/or interior of the vehicle 802. The sensor(s) 806 may provide input to the vehicle computing device(s) 804 and/or to computing device(s) 232.

The vehicle 802 may also include emitter(s) 808 for emitting light and/or sound, as described above. The emitter(s) 808 may include interior audio and visual emitter(s) to communicate with passengers of the vehicle 802. Interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 808 may also include exterior emitter(s). Exterior emitter(s) may include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 802 may also include network interface(s) 810 that enable communication between the vehicle 802 and one or more other local or remote computing device(s). The network interface(s) 810 may facilitate communication with other local computing device(s) on the vehicle 802 and/or the drive component(s) 812. The network interface(s) 810 may additionally or alternatively allow the vehicle to communicate with other nearby computing device(s) (e.g., other nearby vehicles, road signals, etc.). The network interface(s) 810 may additionally or alternatively enable the vehicle 802 to communicate with computing device(s) 232 over a network 238. In some examples, computing device(s) 232 may comprise one or more nodes of a distributed computing system (e.g., a cloud computing architecture).

The vehicle 802 may include one or more drive components 812. In some instances, the vehicle 802 may have a single drive component 812. In some instances, the drive component(s) 812 may include one or more sensors to detect conditions of the drive component(s) 812 and/or the surroundings of the vehicle 802. By way of example and not limitation, the sensor(s) of the drive component(s) 812 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 812. In some cases, the sensor(s) on the drive component(s) 812 may overlap or supplement corresponding systems of the vehicle 802 (e.g., sensor(s) 806).

The drive component(s) 812 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 812 may include a drive component controller which may receive and pre-process data from the sensor(s) and to control operation of the various vehicle systems. In some instances, the drive component controller may include one or more processors and memory communicatively coupled with the one or more processors. The memory may store one or more components to perform various functionalities of the drive component(s) 812. Furthermore, the drive component(s) 812 may also include one or more communication connection(s) that enable communication by the respective drive component with one or more other local or remote computing device(s).

The vehicle computing device(s) 804 may include processor(s) 814 and memory 816 communicatively coupled with the one or more processors 814. Computing device(s) 832 may also include processor(s) 834, and/or memory 836. The processor(s) 814 and/or 834 may be any suitable processor capable of executing instructions to process data and perform operations as described herein. By way of example and not limitation, the processor(s) 814 and/or 834 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 816 and/or 836 may be examples of non-transitory computer-readable media. The memory 816 and/or 836 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), non-volatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 816 and/or memory 836 may store a perception component 818, localization component 880, planning component 822, map(s) 824, driving log data 826, prediction component 828, and/or system controller(s) 830—zero or more portions of any of which may be hardware, such as GPU(s), CPU(s), and/or other processing units.

The perception component 818 may detect object(s) in in an environment surrounding the vehicle 802 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 818 is referred to as perception data. The perception component 818 may be configured to associate a bounding region (or other indication) with an identified object. The perception component 818 may be configured to associate a confidence score associated with a classification of the identified object with an identified object. In some examples, objects, when rendered via a display, can be colored based on their perceived class. The object classifications determined by the perception component 818 may distinguish between different object types such as, for example, a passenger vehicle, a pedestrian, a bicyclist, motorist, a delivery truck, a semi-truck, road signage, and/or the like.

In at least one example, the localization component 880 may include hardware and/or software to receive data from the sensor(s) 806 to determine a position, velocity, and/or orientation of the vehicle 802 (e.g., one or more of an x-, y-, z-position, roll, pitch, or yaw). For example, the localization component 820 may include and/or request/receive map(s) 824 of an environment and can continuously determine a location, velocity, and/or orientation of the autonomous vehicle 802 within the map(s) 824. In some instances, the localization component 820 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 820 may provide data to various components of the vehicle 802 to determine an initial position of an autonomous vehicle for generating a trajectory and/or for generating map data, as discussed herein. In some examples, localization component 820 may provide, to the perception component 818, a location and/or orientation of the vehicle 802 relative to the environment and/or sensor data associated therewith.

The planning component 822 may receive a location and/or orientation of the vehicle 802 from the localization component 820 and/or perception data from the perception component 818 and may determine instructions for controlling operation of the vehicle 802 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 830 and/or drive component(s) 812 may parse/cause to be carried out, second instructions for the emitter(s) 808 may be formatted according to a second format associated therewith).

The driving log data 826 may comprise sensor data, perception data, and/or scenario labels collected/determined by the vehicle 802 (e.g., by the perception component 818), as well as any other message generated and or sent by the vehicle 802 during operation including, but not limited to, control messages, error messages, etc. In some examples, the vehicle 802 may transmit the driving log data 826 to the computing device(s) 832.

The prediction component 828 may generate one or more probability maps representing prediction probabilities of possible locations of one or more objects in an environment. For example, the prediction component 828 may generate one or more probability maps for vehicles, pedestrians, animals, and the like within a threshold distance from the vehicle 802. In some examples, the prediction component 828 may measure a track of an object and generate a discretized prediction probability map, a heat map, a probability distribution, a discretized probability distribution, and/or a trajectory for the object based on observed and predicted behavior. In some examples, the one or more probability maps may represent an intent of the one or more objects in the environment. In some examples, the planner component 822 may be communicatively coupled to the prediction component 828 to generate predicted trajectories of objects in an environment. For example, the prediction component 828 may generate one or more predicted trajectories for objects within a threshold distance from the vehicle 802. In some examples, the prediction component 828 may measure a trace of an object and generate a trajectory for the object based on observed and predicted behavior. Although prediction component 828 is shown on a vehicle 802 in this example, the prediction component 828 may also be provided elsewhere, such as in a remote computing device. In some examples, a prediction component may be provided at both a vehicle and a remote computing device. These components may be configured to operate according to the same or a similar algorithm.

The memory 816 and/or 836 may additionally or alternatively store a mapping system, a planning system, a ride management system, etc. Although perception component 818 and/or planning component 822 are illustrated as being stored in memory 816, perception component 818 and/or planning component 822 may include processor-executable instructions, machine-learned model(s) (e.g., a neural network), and/or hardware.

As described herein, the localization component 820, the perception component 818, the planning component 822, and/or other components of the system 800 may comprise one or more ML models. For example, the localization component 820, the perception component 818, and/or the planning component 822 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as Pixor, in some examples.

Memory 816 may additionally or alternatively store one or more system controller(s) 830, which may be configured to control steering, propulsion, braking, safety, emitters, communication, and other systems of the vehicle 802. These system controller(s) 830 may communicate with and/or control corresponding systems of the drive component(s) 812 and/or other components of the vehicle 802.

It should be noted that while FIG. 8 is illustrated as a distributed system, in alternative examples, components of the vehicle 802 may be associated with the computing device(s) 832 and/or components of the computing device(s) 832 may be associated with the vehicle 802. That is, the vehicle 802 may perform one or more of the functions associated with the computing device(s) 832, and vice versa.

EXAMPLE CLAUSES

The description contains the following clauses:

A. A system comprising: a plurality of microphones; one or more processors; and one or more non-transitory computer-readable media storing computer-executable instructions that, when executed, cause the system to perform operations comprising: determining a first subset of microphones from the plurality of microphones; determining, at a first time and based at least in part on a portion of first data received from the first subset of microphones, a first indication of whether an audio event is present in the environment; determining a second subset of microphones from the plurality of microphones; determining, at a second time and based at least in part on a portion of second data received from the second subset of microphones, a second indication of whether the audio event is present in the environment; and controlling an autonomous vehicle based on at least one of the first indication or the second indication, wherein at least one of the first subset of microphones or the second subset of microphones comprises less than all the microphones of the plurality of microphones.

B. The system of clause A, wherein determining the first subset or the second subset is based at least in part on one or more of: a round-robin schedule; a random schedule;

tracking information indicative of an object associated with the audio event; map data; or environmental features.

C. The system of clause A or clause B, wherein the first indication is determined using a first algorithm, and the second indication is determined using a second algorithm different from the first algorithm, and wherein a microphone in the first subset is determined to be in the second subset based on the first indication.

D. The system of any of clauses A to C, wherein the first subset of microphones comprises a first number of microphones and the second subset of microphones comprises a second number of microphones different from the first number.

E. A method comprising: at a first time, obtaining first data generated by a first subset of microphones of a plurality of microphones associated with an autonomous vehicle in an environment; at a second time that is different from the first time, obtaining second data generated by a second subset of microphones of the plurality of microphones, wherein at least one of the first subset of microphones or the second subset of microphones comprises less than all the microphones of the plurality of microphones; and determining, based on at least one of the first and second data, an indication of whether an audio event is present in the environment.

F. The method of clause E, wherein the first subset of microphones comprises a first microphone, the method further comprising: determining at least one of the first microphone and a second microphone to be in the second subset of microphones based on the first microphone being in the first subset of microphones.

G. The method of clause E or clause F, further comprising: determining a first microphone and second a second microphone to be in the first subset of microphones based on respective positions of the first microphone and the second microphone.

H. The method of any of clauses E to G, further comprising: determining that the indication of whether the audio event is present in the environment meets or exceeds a threshold; and controlling the autonomous vehicle based at least in part on the determining that the probability that the audio event is present in the environment exceeds a threshold.

I. The method of any of clauses E to H, further comprising: determining that a metric associated with the first data meets or exceeds a threshold; and determining a microphone in the first subset to also be in the second subset.

J. The method of any of clauses E to I, comprising: determining a microphone to be in the first subset or the second subset based on data generated by a sensor associated with the autonomous vehicle, the sensor being different from the plurality of microphones.

K. The method of any of clauses E to J, comprising: determining a microphone to be in the first subset or the second subset based at least in part on one or more of: map data, environmental conditions, a detection of an event associated with the audio event based on data generated by a sensor different from the plurality of microphones, or that the first or second data are to be combined with data generated by a sensor different from the plurality of microphones to perform perception event detection.

L. The method of any of clauses E to K, comprising: determining a confidence of audio event detection by a microphone in the first subset of microphones; and determining whether to include the microphone in the second subset of microphones based on the confidence.

M. The method of any of clauses E to L, wherein the indication is determined based on the first data, the method comprising: determining a time interval over which the second data is obtained based on the first data.

N. The method of any of clauses E to M, wherein a first microphone of the plurality of microphones is associated with a first wiring harness, and a second microphone of the plurality of microphones is associated with a second wiring harness, the method comprising: determining the first and second microphones to be in a same one of the first and second subsets.

O. The method of any of clauses E to N, wherein the first data and the second data correspond to sound detected between a third time and a fourth time.

P. The method of any of clauses E to O, wherein the probability is determined based on at least the first data, and wherein a time interval between the first and second times is determined based at least in part on the probability.

Q. One or more non-transitory computer-readable media storing instructions that, when executed, cause one or more processors to perform operations comprising: at a first time, obtaining first data generated by a first subset of microphones of a plurality of microphones associated with an autonomous vehicle in an environment; at a second time that is different from the first time, obtaining second data generated by a second subset of microphones of the plurality of microphones, wherein at least one of the first subset of microphones or the second subset of microphones comprises less than all the microphones of the plurality of microphones; and determining, based on at least one of the first and second data, an indication that an audio event is present in the environment.

R. The one or more non-transitory computer-readable media according to clause Q, wherein the first subset of microphones comprises a first microphone, and wherein the instructions cause the one or more processors to perform further operations comprising: determining at least one of the first microphone and a second microphone to be in the second subset of microphones based on the first microphone being in the first subset of microphones.

S. The one or more non-transitory computer-readable media according to clause Q or clause R, wherein the indication is determined based on the first data, and the instructions cause the one or more processors to perform further operations comprising: determining a time interval over which the second data is obtained based on the first data.

T. The one or more non-transitory computer-readable media according to any of clauses Q to S, wherein a first microphone of the plurality of microphones is associated with a first wiring harness, and a second microphone of the plurality of microphones is associated with a second wiring harness, and wherein the instructions cause the one or more processors to perform further operations comprising: determining the first and second microphones to be in a same one of the first and second subsets.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into subcomputations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow charts, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

a plurality of microphones;

one or more processors; and one or more non-transitory computer-readable media storing computer-executable instructions that, when executed, cause the system to perform operations comprising:

designating a first subset of microphones from the plurality of microphones for processing;

determining, at a first sampling time and based at least in part on designating the first subset of microphones and on a portion of first data received from the first subset of microphones, a first indication of whether an audio event is present in the environment;

designating a second subset of microphones from the plurality of microphones for processing;

determining, at a second sampling time and based at least in part on designating the second subset of microphones and on a portion of second data received from the second subset of microphones, a second indication of whether the audio event is present in the environment; and controlling an autonomous vehicle based on at least one of the first indication or the second indication, wherein at least one of the first subset of microphones or the second subset of microphones comprises less than all the microphones of the plurality of microphones.

2. The system of claim 1, wherein designating the first subset or the second subset is based at least in part on one or more of:

a round-robin schedule;

a random schedule;

tracking information indicative of an object associated with the audio event;

map data; or environmental features.

3. The system of claim 1, wherein the first indication is determined using a first algorithm, and the second indication is determined using a second algorithm different from the first algorithm, and wherein a microphone in the first subset is designated as part of the second subset based on the first indication.

4. The system of claim 1, wherein the first subset of microphones comprises a first number of microphones and the second subset of microphones comprises a second number of microphones different from the first number.

5. A method comprising:
determining a first subset of microphones of a plurality of microphones associated with an autonomous vehicle in an environment for processing;
at a first sampling time, obtaining first data generated by the first subset of microphones;
determining a second subset of microphones of the plurality of microphones for processing;
at a second sampling time that is different from the first sampling time, obtaining second data generated by the second subset of microphones, wherein at least one of the first subset of microphones or the second subset of microphones comprises less than all the microphones of the plurality of microphones; and
determining, based on at least one of the first and second data, an indication of whether an audio event is present in the environment.

6. The method of claim 5, wherein the first subset of microphones comprises a first microphone, the method further comprising:
determining at least one of the first microphone and a second microphone to be in the second subset of microphones based on the first microphone being in the first subset of microphones.

7. The method of claim 5, further comprising:
determining a first microphone and a second microphone to be in the first subset of microphones based on respective positions of the first microphone and the second microphone.

8. The method of claim 5, further comprising:
determining that the indication of whether the audio event is present in the environment meets or exceeds a threshold; and
controlling the autonomous vehicle based at least in part on the determining that the indication of whether the audio event is present in the environment exceeds a threshold.

9. The method of claim 5, further comprising:
determining that a metric associated with the first data meets or exceeds a threshold; and
determining a microphone in the first subset to also be in the second subset.

10. The method of claim 5, comprising:
determining a microphone to be in the first subset or the second subset based on data generated by a sensor associated with the autonomous vehicle, the sensor being different from the plurality of microphones.

11. The method of claim 5, comprising:
determining a microphone to be in the first subset or the second subset based at least in part on one or more of:
map data,
environmental conditions,
a detection of an event associated with the audio event based on data generated by a sensor different from the plurality of microphones, or
that the first or second data are to be combined with data generated by a sensor different from the plurality of microphones to perform perception event detection.

12. The method of claim 5, comprising:
determining a confidence of audio event detection by a microphone in the first subset of microphones; and
determining whether to include the microphone in the second subset of microphones based on the confidence.

13. The method of claim 5, wherein the indication is determined based on the first data, the method comprising:
determining a time interval over which the second data is obtained based on the first data.

14. The method of claim 5, wherein a first microphone of the plurality of microphones is associated with a first wiring harness, and a second microphone of the plurality of microphones is associated with a second wiring harness, the method comprising:
determining the first and second microphones to be in a same one of the first and second subsets.

15. The method of claim 5, wherein the first data and the second data correspond to sound detected between a third time and a fourth time.

16. The method of claim 5, wherein the indication is determined based on at least the first data, and wherein a time interval between the first and second sampling times is determined based at least in part on the indication.

17. One or more non-transitory computer-readable media storing instructions that, when executed, cause one or more processors to perform operations comprising:
determining a first subset of microphones of a plurality of microphones associated with an autonomous vehicle in an environment for processing;
at a first sampling time, obtaining first data generated by the first subset of microphones;
determining a second subset of microphones of the plurality of microphones for processing;
at a second sampling time that is different from the first sampling time, obtaining second data generated by the second subset of microphones, wherein at least one of the first subset of microphones or the second subset of microphones comprises less than all the microphones of the plurality of microphones; and
determining, based on at least one of the first and second data, an indication that an audio event is present in the environment.

18. The one or more non-transitory computer-readable media according to claim 17, wherein the first subset of microphones comprises a first microphone, and wherein the instructions cause the one or more processors to perform further operations comprising:
determining at least one of the first microphone and a second microphone to be in the second subset of microphones based on the first microphone being in the first subset of microphones.

19. The one or more non-transitory computer-readable media according to claim 17, wherein the indication is determined based on the first data, and the instructions cause the one or more processors to perform further operations comprising:
determining a time interval over which the second data is obtained based on the first data.

20. The one or more non-transitory computer-readable media according to claim 17, wherein a first microphone of the plurality of microphones is associated with a first wiring harness, and a second microphone of the plurality of microphones is associated with a second wiring harness, and wherein the instructions cause the one or more processors to perform further operations comprising:

determining the first and second microphones to be in a same one of the first and second subsets.

* * * * *